United States Patent [19]

Eisbrecher et al.

[11] 4,427,398
[45] Jan. 24, 1984

[54] DEVICE FOR COUPLING AND UNCOUPLING TWO PARTS MOVABLE RELATIVE TO EACH OTHER USING A LENGTH-VARIABLE GUIDE ROD

[75] Inventors: Hans-Dieter Eisbrecher, Vellmar; Helmut Ruppert, Kassel, both of Fed. Rep. of Germany

[73] Assignee: Thyssen Industrie Aktiengesellschaft, Essen, Fed. Rep. of Germany

[21] Appl. No.: 314,104

[22] Filed: Oct. 23, 1981

[30] Foreign Application Priority Data

Oct. 29, 1980 [DE] Fed. Rep. of Germany ....... 3040650

[51] Int. Cl.³ .............................................. F16D 3/06
[52] U.S. Cl. ..................... 464/26; 464/169; 464/183
[58] Field of Search .................. 464/169, 26, 24, 162, 464/183

[56] References Cited

U.S. PATENT DOCUMENTS

| | | | |
|---|---|---|---|
| 1,820,442 | 8/1931 | Cooper | 464/26 |
| 2,006,578 | 7/1935 | Tate | 464/26 |
| 2,598,780 | 6/1952 | Garnier | 464/169 |
| 3,528,510 | 9/1970 | Peterson | 464/26 |
| 4,270,367 | 6/1981 | Santore | 464/169 |

*Primary Examiner*—Ira S. Lazarus
*Attorney, Agent, or Firm*—Becker & Becker, Inc.

[57] ABSTRACT

A device for coupling and uncoupling two parts which are movable relative to each other, particularly parts of the drives of vehicles, for instance for high-speed power vehicles, by means of a length-variable guide rod. On the tubular guide rod segment there is arranged a housing having a cylinder chamber in which the cylindrical part of the axially shiftable guide rod segment extends, this cylindrical part being provided with engaging portions for annular pistons which surround it. Two annular pistons are supports for a preloaded coil spring arranged therebetween, and upon pulling or compressive force, one of the spring-loaded annular pistons, depending upon the direction of force, is axially shifted against the preloaded coil spring by the corresponding engaging portion of the cylindrical rod part of the guide rod segment. At least one spring-loaded annular piston can be acted upon by pressure medium introduced into the cylinder chamber through an associated connection, and can be fixed in its acted-upon end position by means of a locking device located on the housing, with the guide rod segment being axially free, or shiftable at a lower force level, relative to the fixed annular piston by a given distance. The annular piston which is securely held by the locking device, after cancelling the positive connection and discharging the pressure medium from the cylinder chamber, is returned to its starting position by the pressure of the coil spring.

9 Claims, 9 Drawing Figures

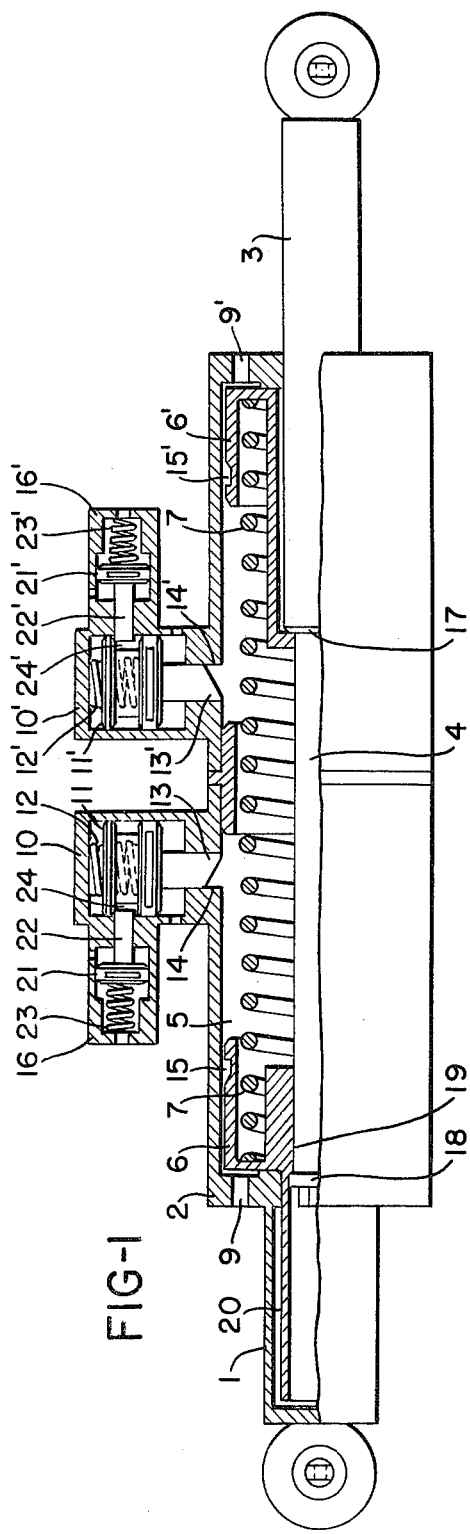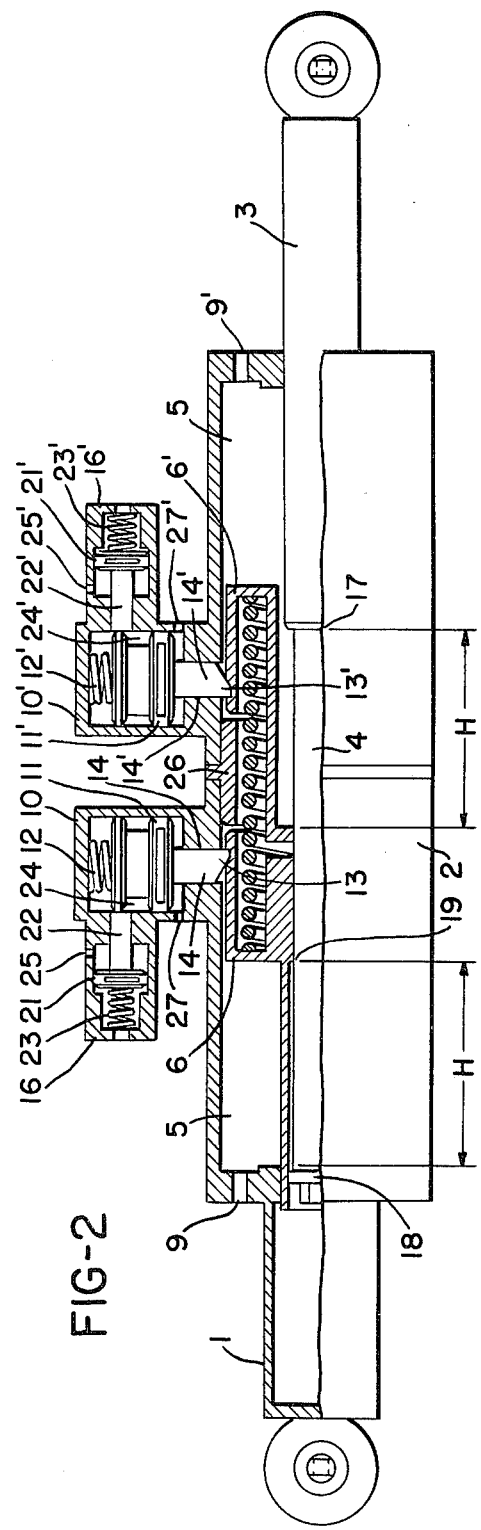

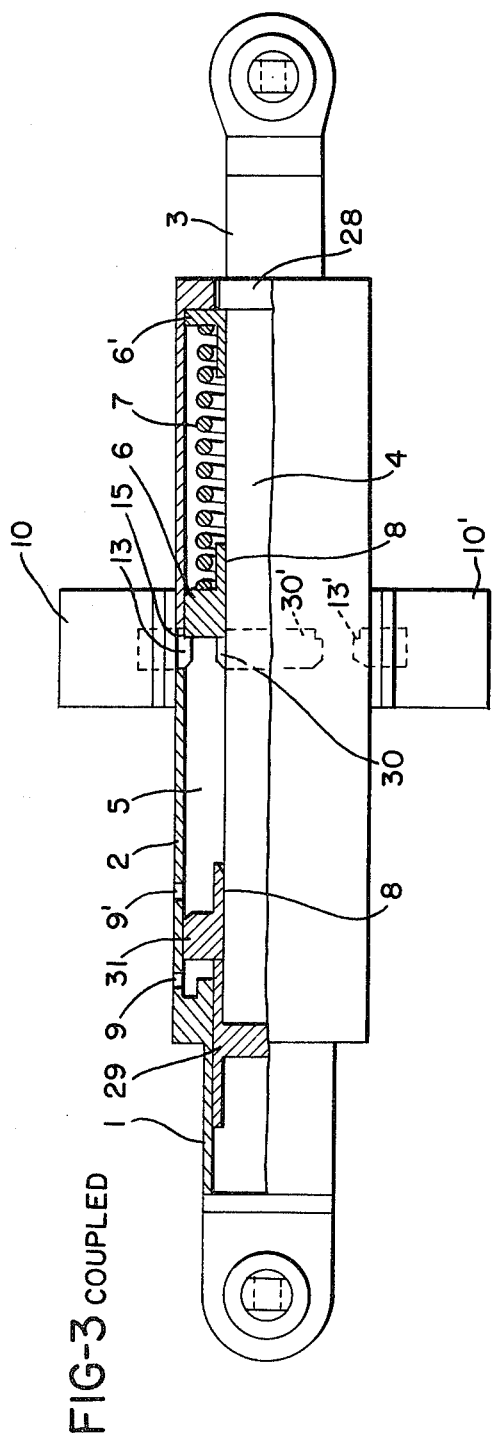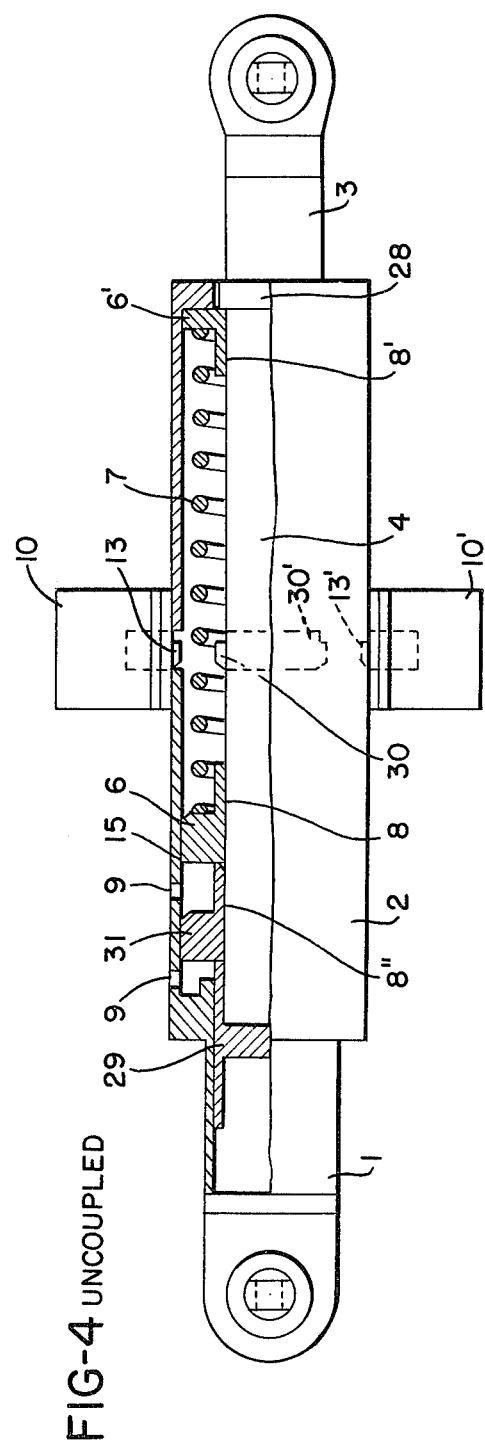

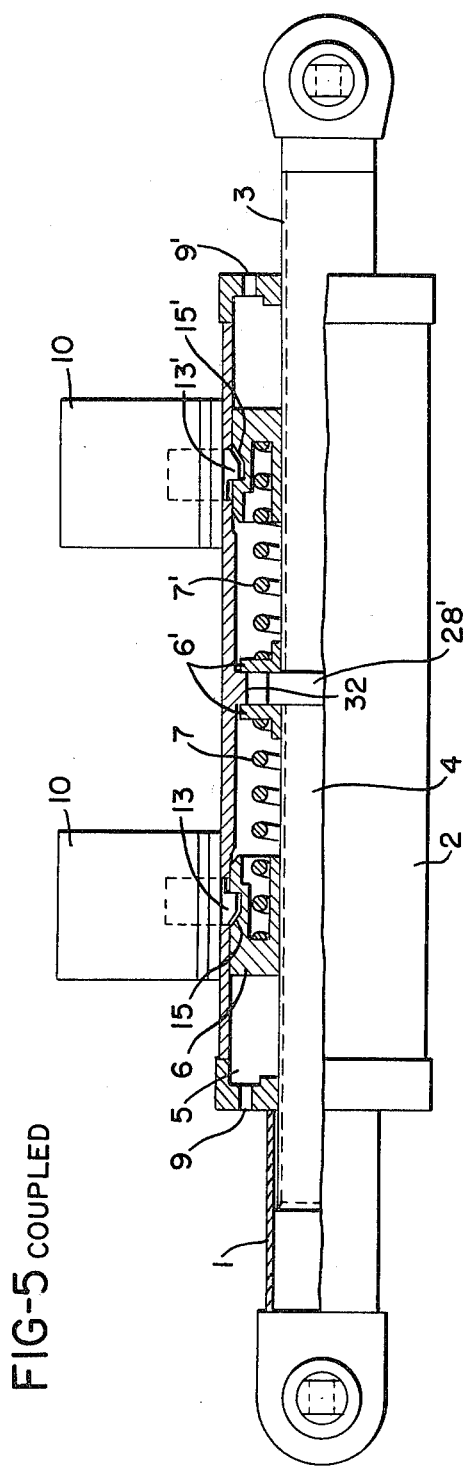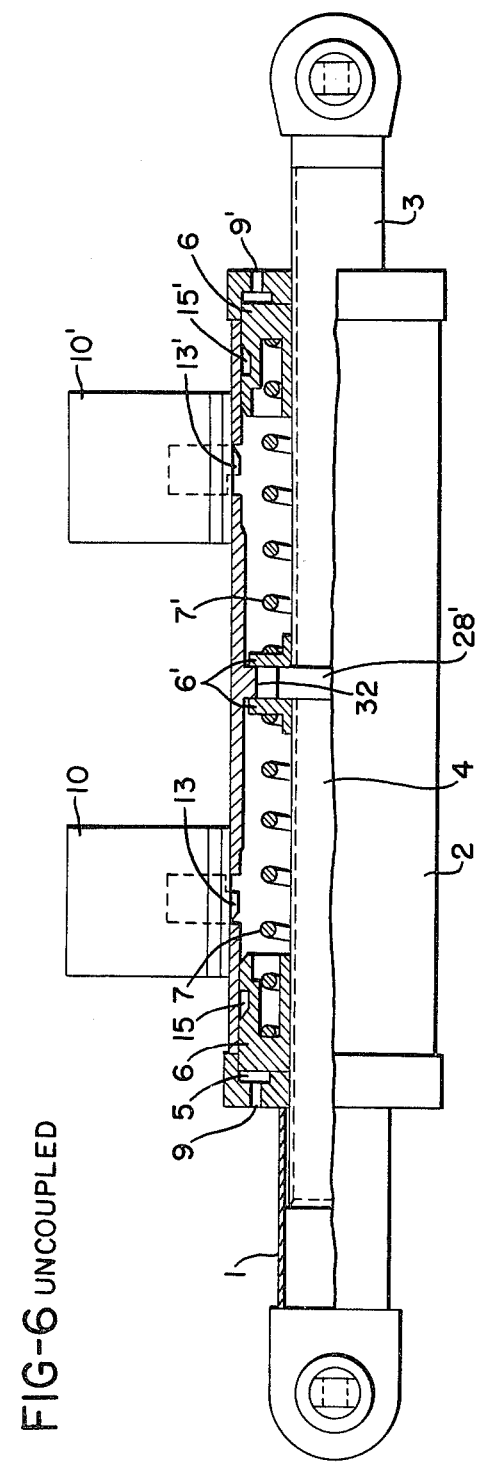

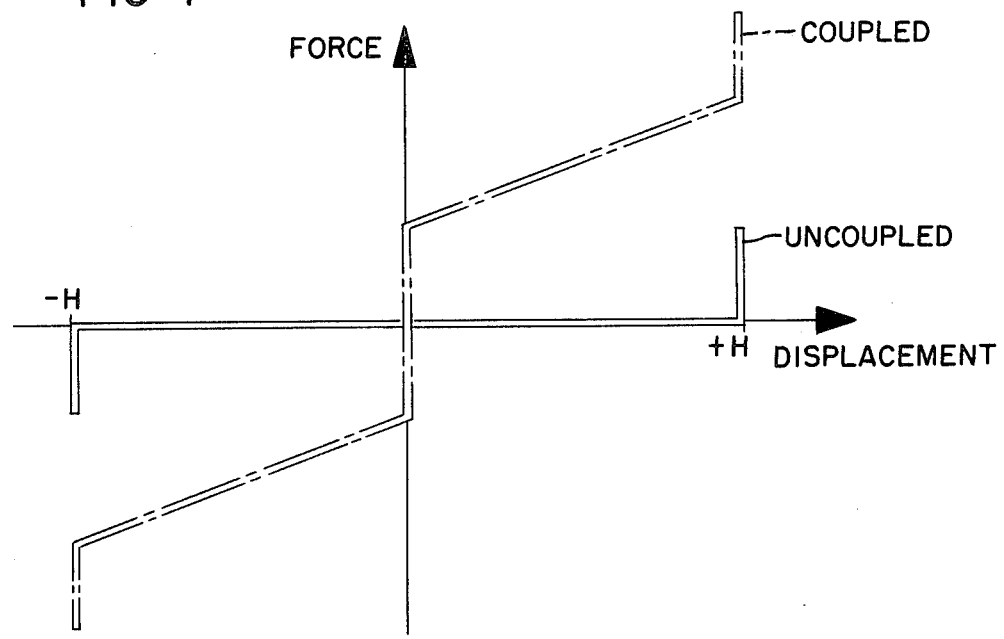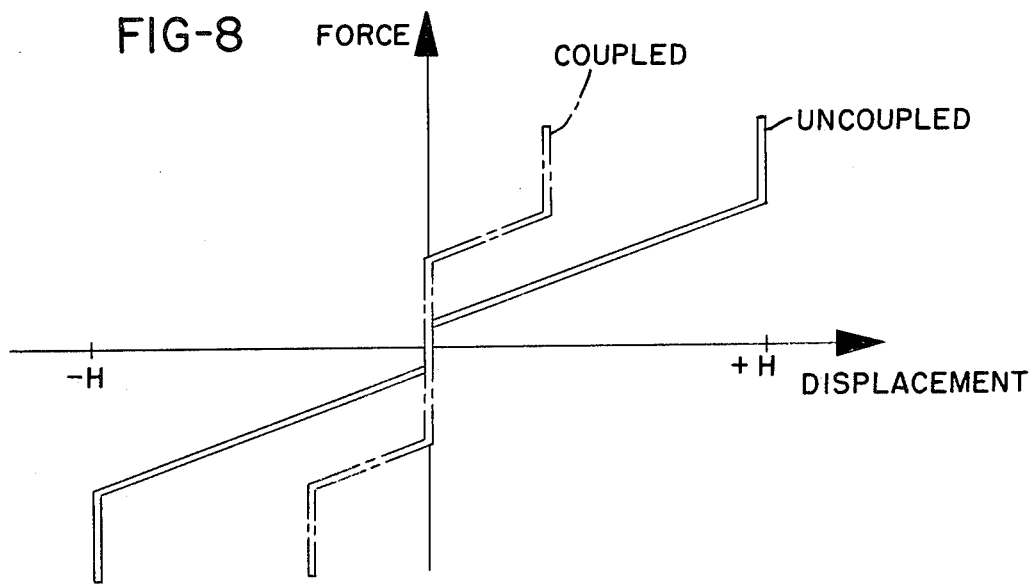

DEVICE FOR COUPLING AND UNCOUPLING TWO PARTS MOVABLE RELATIVE TO EACH OTHER USING A LENGTH-VARIABLE GUIDE ROD

The present invention relates to a device for coupling and uncoupling two parts which are movable relative to each other via a length-variable guide rod, particularly parts of the drives of vehicles, for instance for high-speed power vehicles.

Such guide rods are found, for example, in power vehicles between a power-transmission system and a vehicle car or between the power-transmission system and a drive assembly frame. Since the moving behavior of a vehicle, particularly a rail power vehicle, is, of course, that much better in relation to the smaller the ratio of the nonelastic mass relative to the elastic or spring-suspended mass, the power transmission system at high traveling speeds along straight stretches or track sections is rigidly connected with the vehicle car, and at low traveling speeds in curves is rigidly connected with the drive assembly frame, by means of a guide rod associated therewith in pairs, whereby the other guide rods are freely length-movable.

Transverse guide rods are known from German Offenlegungsschrift No. 28 22 992 for a power vehicle in which mechanically, electromechanically, hydraulically, or pneumatically switchable coupling elements are found which in the uncoupled condition are additionally effective as oscillation dampers.

Although such constructions are reliable with respect to the coupling, they have the drawback that in the coupled condition no yielding is possible when large forces arise, and consequently damage and even failure in the drive, or operation-endangering conditions, can occur.

It is therefore an object of the present invention to provide a device of the initially mentioned type which even in the coupled condition makes possible some axial shifting in both directions, and is automatically returned to the starting position after every shifting procedure. The device is to be constructed as simple as possible, and is to be inexpensive to produce.

This object, and other objects and advantages of the present invention, will appear more clearly from the following specification in connection with the accompanying drawings, in which:

FIG. 1 is a partially sectioned schematic illustration of a length-variable guide rod, with the inventive device, in coupled condition;

FIG. 2 shows the device of FIG. 1 in uncoupled condition;

FIG. 3 is a partially sectioned view of another embodiment of the inventive device in coupled condition;

FIG. 4 shows the device of FIG. 3 in uncoupled condition;

FIG. 5 is a partially sectioned view of still another embodiment of the present inventive device in coupled condition;

FIG. 6 shows the device of FIG. 5 in uncoupled condition;

FIG. 7 is a graph of the spring characteristic curve of the device according to FIGS. 1 and 2;

FIG. 8 is a graph of the spring characteristic curve of the device according to FIGS. 3 and 4.

Figure 9:
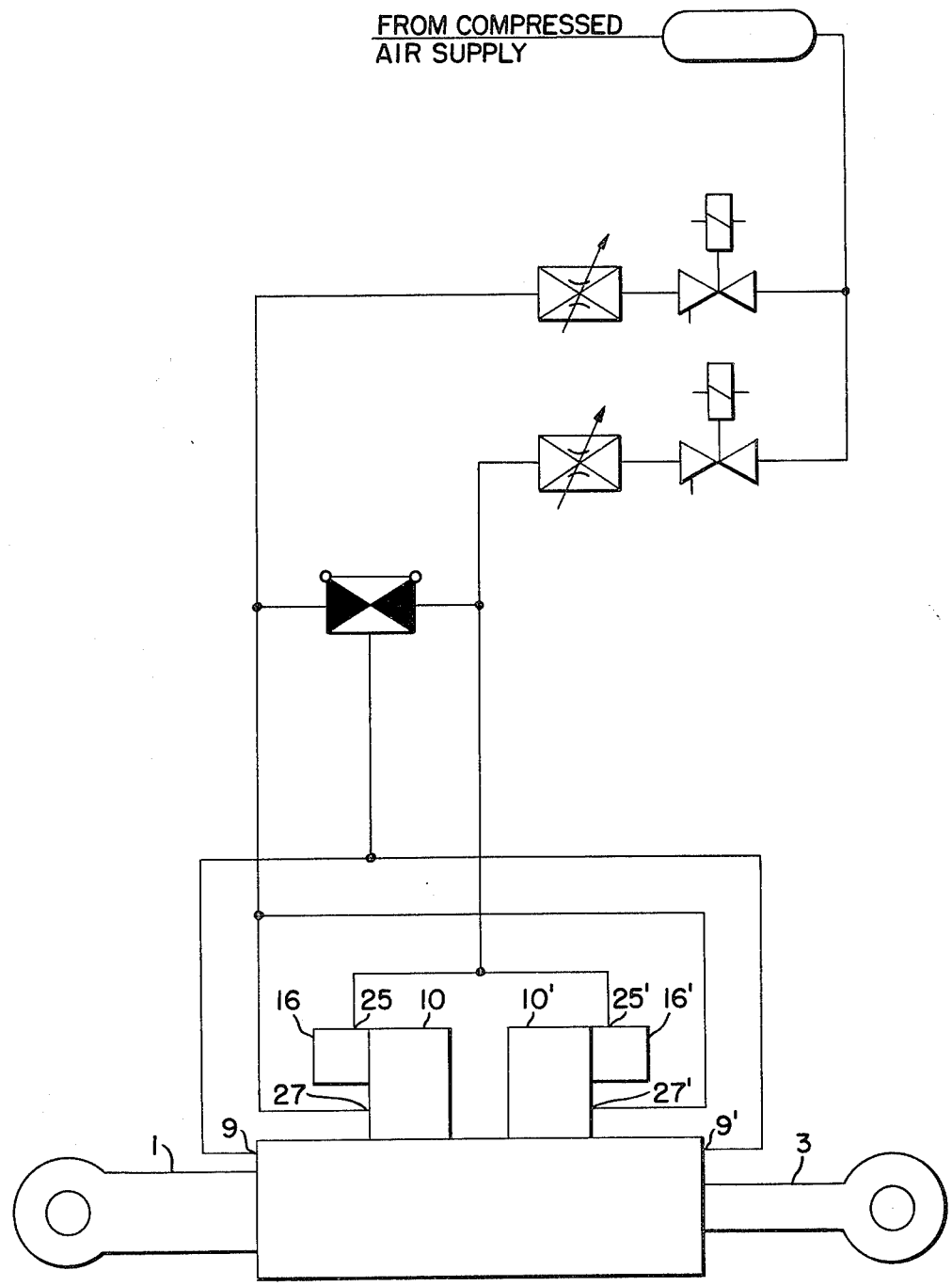
FIG. 9 schematically illustrates a control device for controlling the supply of pressure medium.

The device of the present invention is characterized primarily in that:

(a) on the tubular guide rod segment there is arranged a housing having a cylinder chamber in which the cylindrical part of the axially shiftable guide rod segment extends, this cylindrical part being provided with engaging portions for annular pistons which surround it;

(b) two annular pistons are supports for a preloaded coil spring arranged therebetween, and upon pulling or compressive force, one of the spring-loaded annular pistons, depending upon the direction of force, is axially shifted against the preloaded coil spring by the corresponding engaging portion of the cylindrical rod part of the guide rod segment;

(c) at least one spring-loaded annular piston can be acted upon by pressure medium introduced into the cylinder chamber through an associated connection, and can be fixed in its acted-upon end position by means of a locking device located on the housing, with the guide rod segment being axially free, or shiftable at a lower force level, relative to the fixed annular piston by a given distance; and (d) the annular piston which is securely held by the locking device, after cancelling the positive connection and discharging the pressure medium from the cylinder chamber, is returned to its starting position by the pressure of the coil spring.

The advantages attained with the present invention are based especially thereon that by way of the spring-preloaded annular pistons, in the coupled condition a desired axial shifting of the two guide rod segments which are to be connected with each other is still possible. Additionally, there is assured that the annular pistons always return to their starting positions by means of the compressive force of the coil spring surrounding the axially shiftable guide rod segment after cancellation of the pulling or compressive force, and furthermore that already during shifting of only one spring-loaded annular piston into its locked position, an axial shifting of the guide rod segment can be carried out.

According to advantageous further embodiments of the present invention, both spring-loaded annular pistons, in the coupled condition, can be simultaneously supported against the end walls of the cylinder chamber, as well as against the engaging portions of the cylindrical rod part, solely by the preloading of the coil spring, and after being acted upon by pressure medium, can be locked in the uncoupled condition by pressing together the coil spring.

In the coupled condition, one of the two spring-loaded annular pistons can be locked while being acted upon by pressure medium and with the coil spring pressed together or compressed, and the other annular piston is supportable against an end wall of the cylinder chamber, or against an annular projection in the cylinder chamber and simultaneously against the engaging portion of the cylindrical rod part, while in the uncoupled condition, the annular piston which can be acted upon engages the end wall of the cylinder wall only under the preloading of the coil spring, or engages a T-shaped shoulder of the cylindrical rod part through the interposition of a non-spring-loaded annular piston which can be acted upon.

A snap device, which projects into the cylinder chamber in the operating position, may be provided in the cylindrical rod part for the spring-loaded annular piston which can be acted upon; this snap device cooperates with the locking pin and is located across from the locking device. The snap device can be returned from its operating position to its rest position by means of the piston neck of the non-spring-loaded annular piston which can be acted upon by pressure medium.

The locking device may comprise a piston-cylinder unit, and in the operating position, its locking pins, which are under spring pressure, may engage a recess of the spring-loaded annular piston.

The locking device may also be provided with a blocking device which is likewise formed of a piston-cylinder unit; the spring-loaded pin of the blocking device, in the rest position of the locking device, can be inserted into a peripheral groove of the spring-loaded piston of the locking device.

The cylinder chambers of the locking device and of the blocking device may be connected by conduits with the cylinder chamber in the housing, and may be affected by at least one control device.

The fastening eye located at the outer end of each guide rod segment may be provided with a cardanically movable wear-resistant or wear-free bearing.

Referring now to the drawings in detail, which schematically illustrates sample embodiments of the present invention, the tubular guide rod segment 1 has a housing 2 into which the cylindrical part 4 of the axially shiftable guide rod segment 3 projects. Annular pistons 6,6' are arranged in the cylinder chamber 5 of the housing 2; these annular pistons 6,6' serve as supports for the helical springs 7 which are located between them and surround the cylindrical part 4 of the guide rod segment 3. All of the annular pistons 6,6' have a piston neck 8 which extends along the cylindrical rod part 4. The cylinder chamber 5 is provided with connections 9 for a pressure medium, such as air or the like, for engaging the annular pistons 6,6'. On the housing 2, which can be made either unitary or can be assembled from segments, there is located a locking device 10,10' for each annular piston, which is acted upon by and serves to support a spring. Each locking device 10,10' comprises a piston-cylinder unit, with a spring-loaded piston 11,11', on that side thereof facing away from the spring 12,12', having a locking pin 13, 13' which extends in the direction of the longitudinal axis of the cylinder and is guided in an opening 14, 14' that opens into the cylinder chamber 5 of the guide rod housing 2.

To hold the spring-loaded annular piston 6,6' in its engaged final position, it is provided with a peripheral recess 15, 15' for the locking pin 13, 13'. The locking device 10, 10' is provided with a blocking device 16, 16' to fix the locking pin 13, 13' in its rest position; this blocking device 16, 16' likewise comprises a piston-cylinder unit which essentially corresponds to the locking device 10, 10'. Since the mechanical construction is the same with all of the embodiments, functionally identical components are provided with identical reference numerals.

Two annular pistons 6 and 6' are provided in the embodiment of FIGS. 1 and 2, with a preloaded coil spring 7 arranged therebetween, the ends of the spring being supported on these pistons 6 and 6'. In the coupled condition illustrated by FIG. 1, the two annular pistons engage the end walls of the cylinder chamber 5.

One shoulder 17 of the cylindrical part 4 of the guide rod segment 3 engages the annular piston 6' associated with the rod segment 3, and a disc 18 fastened to the free end thereof engages a shoulder 19 of the other annular piston 6. A sleeve 20 arranged coaxially with respect to the cylindrical part 4 of the guide rod segment 3 adjoins the shoulder 19 of this annular piston 6, which is associated with the rod segment 1. In this position, a pin 22, 22' located on the piston 21, 21' of the blocking device 16, 16' projects into a peripheral groove 24, 24' in the piston 11, 11' of the locking device 10, 10' by way of the pressure of a spring 23, 23'. The pins 22, 22' rigidly hold the pistons 11, 11', with their locking pins 13, 13', in the rest position. In this position, the guide rod segment 3 is axially shiftable against the force of the preloaded coil spring 7 for absorbing pulling or compressive forces acting thereon and exceeding the spring preloading, FIG. 7. In this condition, depending upon the direction of force, either one or the other annular piston is moved towards the middle of the housing.

After absorbing the pulling or compressive force, the axially shiftable guide rod segment 3 is always returned to its starting position (middle position) by means of the preloaded coil spring 7. For the purpose of now transferring the guide rod from the coupled condition into the uncoupled condition of FIG. 2, both annular pistons 6 and 6' are acted upon via the connections 9 and 9', and press the coil spring 7 together while shifting towards each other. As soon as each spring-loaded annular piston 6, 6' has reached the acted-upon end position, i.e. the locking position, the pistons 21, 21' of the blocking devices 16, 16' are acted upon by pressure medium via the connections 25,25', and the pins 22, 22' leave the peripheral grooves 24, 24' in the pistons 11, 11' of the locking devices 10, 10'. The thus released pistons 11, 11' are moved by the pressure of the springs 12, 12', and the locking pins 13, 13' engage the recesses 15, 15' of the annular pistons 6,6'. In this position of the two annular pistons 6 and 6', the guide rod segment 3 is axially shiftable in both directions by the distance H, and in particular freely in the uncoupled condition, and against spring force in the coupled condition. This distance H corresponds not only to the stroke of the annular pistons 6,6', but also to the displacement of the spring 7. FIG. 7 shows the characteristic curve of the device.

To avoid pressing the coil spring windings against each other, an abutment 26 is arranged in the cylinder chamber 5 for the two annular pistons 6 and 6'. This abutment 26 simultaneously keeps the coil spring 7 from buckling or bending at a sharp angle. To release the engaged locking pins 13, 13', the pistons 11, 11' of the locking device 10, 10' are acted upon by pressure medium via connections 27, 27', and are moved against the force of the spring 12, 12'. As soon as the peripheral grooves 24, 24' in the pistons 11, 11' are located in the vicinity of the pins 22, 22' of the blocking devices 16, 16', the pressure medium flows through the connections 25, 25' out of the blocking devices 16, 16', the springs 23, 23' press the pistons 21, 21' in the direction of the locking devices 10, 10', and the pins 22, 22' are pushed into the peripheral grooves 24, 24' of the pistons 11, 11'. In the operating positions of the devices 10, 10' and 16, 16', the pistons 11, 11' and 21,21' are loaded only by the pressure of the associated springs 12, 12' and 23,23', whereas in the rest positions of the pistons 11, 11', the locking device 10,10' is held by the pins 22, 22' of the blocking device 16, 16', and the pistons 21,21' thereof under the pressure of the medium are introduced through the connection 25, 25'. After terminating the coupling procedure, the pistons are relieved of the pressure of the adjusting medium by means of appropriate external control.

With the embodiment according to FIGS. 3 and 4, the cylindrical part 4 of the shiftable rod segment 3 is provided with a shoulder or flange 28 as an abutment for the spring-loaded annular piston 6', and is also provided at its free end with a shoulder 29 having an I-shaped cross section, the horizontal leg segments of which serve as abutments. Furthermore, two diametrically oppositely located snap closures 30 and 30' for the acted-upon spring-loaded annular piston 6 are arranged in the cylindrical part 4 of the rod segment 3. These snap closures 30 and 30' cooperate synchronously with the two locking devices 10, 10', which are likewise located across from each other on the housing 2. Additionally, a further acted-upon, but not spring-loaded, piston 31, which is arranged between the acted-upon spring-loaded annular piston 6 and the housing end wall associated with the rigid guide rod segment 1, is located in the cylinder chamber 5 of the housing 2 in addition to the two spring-loaded annular pistons 6 and 6'. In the so-called uncoupled condition of FIG. 4, the following movement is possible: With a compressive force which exceeds the preloading of the coil spring 7 supported against the two annular pistons 6 and 6', the shoulder 28 located on the cylindrical part 4 of the rod segment 3 shifts or pushes the annular piston 6' toward the middle of the housing 2 until that horizontal leg segment of the shoulder 29 facing away from the annular piston engages the end face of the tubular guide rod segment 1. With an appropriate pulling force, the annular piston 31, and thereby the spring-loaded annular piston 6, are shifted or pushed toward the middle of the housing by means of that horizontal leg segment of the shoulder 29 facing the annular piston.

In order to shift the guide rod into the coupled condition of FIG. 3, the spring-loaded annular piston 6 is acted upon by pressure medium via the connection 9'; after it reaches its locking position, the piston 6 is held securely not only by the locking pins 13, 13' of the locking devices 10, 10', but also by the snap devices 30, 30'. In this coupled condition, when a compressive force which exceeds the now increased preloading of the coil spring 7 supported against the annular pistons 6 and 6', the shoulder 28, which is located on the cylindrical part 4 of the rod segment 3, shifts the annular piston 6' toward the middle of the housing 2 until the piston neck 8' engages the piston neck 8. With an appropriate pulling force, and by means of the snap devices 30, 30' which support the annular piston 6 on the cylindrical part 4 of the rod segment 3, the spring-loaded annular piston 6 is shifted to the end of the housing 2 until the piston neck 8 of the annular piston 6 engages the annular piston 8' of the annular piston 6'. To shift from the coupled condition into the uncoupled condition of FIG. 4, the pressure medium is discharged from the spring-loaded annular piston 6 via the connection 9' out of the cylinder chamber 5, and the non spring-loaded annular piston 31 is acted upon by pressure medium via the connection 9 and is moved toward the spring-loaded annular piston 6. The piston neck 8" of the non-spring-loaded annular piston 31 presses the snap devices 30, 30' out of their holding position back into the cylindrical part 4 of the shiftable rod segment 3. The spring-loaded annular piston 6 is released by the synchronous movement of the snap deices 30,30', and the locking pins 13, 13', which are released by the pressure medium; and upon simultaneous discharge of the pressure medium from the connection 9, the piston 6 is moved by the pressure of the coil spring 7 into the position illustrated in FIG. 4, with the non-spring-loaded annular piston 31 being moved along by the spring-loaded annular piston 6. FIG. 8 shows the characteristic curve of this device, with the distance H being the possible displacement which the device (the coupling element) permits in the uncoupled condition of FIG. 4. In the coupled condition of FIG. 3, the device permits only a small displacement with a steep characteristic curve.

With the arrangement of FIGS. 5 and 6, the shoulder 28' is located approximately in the longitudinal middle of the cylindrical part 4 of the shiftable guide rod segment 3, and the cylinder chamber 5 in the housing 2 is subdivided into two symmetrical halves by an annular projection 32. Of the spring-loaded annular pistons 6 and 6' arranged in each cylinder chamber half, the inner annular pistons 6' are supported not only on the shoulder 28', but also on the projection 32. By axially shifting the rod segment 3 by pulling or compressive forces, one or the other inner spring-loaded annular pistons 6' is moved by the shoulder 28', depending upon the direction of force, toward the corresponding spring-loaded annular piston 6 supported against the end wall of the cylinder chamber 5. Each of the two outer annular pistons 6 is acted upon by fluid medium via the associated connection 9, 9', and is held or secured in its loaded position by the locking pins 13, 13' of the locking devices 10, 10' (FIG. 5). The guide rod is shifted from this coupled condition into the uncoupled condition of FIG. 6, by the compressive force of the preloaded coil springs 7,7' on the annular pistons 6, after releasing the locking pins 13, 13' from the recesses 15, 15' of the spring-loaded annular pistons 6 while discharging the pressure medium via the connections 9, 9'. FIG. 8 shows the characteristic curve of this device.

The engagement or acting-upon of the annular pistons in the cylinder chamber 5 of the housing 2 by the pressure medium is controllable by a control device, as shown in FIG. 9. To the extent that this inventive device is utilized with a rail vehicle which is equipped with a device for controlling or steering, for instance of the vehicle or car body, the control device can be combined with this device. The fastening eye located at the outer end of each guide rod segment advantageously be provided with a maintenance-free wear-resistant or wear-free cardanically movable bearing or mounting.

The present invention is, of course, in no way restricted to the specific disclosure of the specification and drawings, but also encompasses any modifications within the scope of the appended claims.

What is claimed is:

1. A device for coupling and uncoupling two parts which are movable relative to one another by means of a length-variable guide rod, said device comprising:
   a tubular guide rod segment;
   a housing arranged on said tubular guide rod segment and having a cylinder chamber;
   an axially shiftable guide rod segment provided with a cylindrical part which extends in said cylinder chamber;
   two sets of at least one annular piston each, said sets of annular pistons being arranged in said cylinder chamber and around said cylindrical part of said axially shiftable guide rod segment;
   engaging portions being arranged on said cylindrical part for engaging said annular pistons;
   at least one preloaded coil spring arranged between said annular pistons, which serve as supports therefor and are therefor spring-loaded, with one of said spring-loaded annular pistons, upon exertion of a pulling or compressive force on said axially shiftable guide rod segment, being axially shifted against said coil spring by the associated engaging portion of said cylindrical part;

at least one connection provided in said housing and connected to a source of pressure medium for selectively supplying and withdrawing, pressure medium to and from at least one of said annular pistons; and at least one locking device arranged on said housing for fixing said annular piston which is acted upon by pressure medium in an end position in such a way that said axially shiftable guide rod segment is axially free, or is shiftable at a lesser force, by a given distance relative to said now fixed annular piston, said fixed annular piston being releasable by said locking device and, after discharge of pressure medium, being returnable to its spring-loaded starting position by the pressure of said coil spring.

2. A device according to claim 1, in which said cylinder chamber includes two end walls at axially opposite ends thereof, and in which each set of annular pistons includes one piston, both of said spring-loaded annular pistons, when not acted upon by pressure medium, being supported against a respective end wall of said cylinder chambe, as well as against a respective engaging portion of said cylinder part, solely by the preloading of said coil spring, and when acted upon by pressure medium, with said coil spring pressed together, being locked by said locking device.

3. A device according to claim 1, in which said cylinder chamber includes a first and second end wall at axially opposite ends thereof; in which each set of annular pistons includes one piston; in which one of said two spring-loaded annular pistons is locked by said locking device while being acted upon by pressure medium and with said coil spring pressed together, with the other of said spring-loaded annular pistons being supported against the associated first end wall of said cylinder chamber and also against an engaging portion of said cylindrical part; which includes an additional non spring-loaded annular piston arranged between said spring-loaded annular piston which is acted upon by pressure medium, and said second end wall of said cylinder chamber; and which incudes a T-shaped shoulder on said cylindrical part in the vicinity of said second end wall of said cylinder chamber, said non spring-loaded annular piston being adapted to rest against said T-shaped shoulder, said one of said two spring-loaded annular pistons, when no longer acted upon by pressure medium, being supported against said non spring-loaded annular piston only under the preloading of said coil spring, with said non spring-loaded annular piston resting against said T-shaped shoulder.

4. A device according to claim 1, in which said cylinder chamber includes two end walls at axially opposite ends thereof; in which each set of annular pistons includes two pistons; which includes two preloaded coil springs one between the annular pistons of each set of annular pistons; which includes an annular projection on said housing projecting into said cylinder chamber to substantially divide it in half; in which one annular piston of each set of annular pistons is locked by said locking device while being acted upon by pressure medium and with said coil springs pressed together, with the other annular piston of each set of annular pistons being supported against and on opposite sides of said annular projection and also against an engaging portion of said cylindrical part; and in which said one annular piston of each set of annular pistons, when no longer acted upon by pressure medium, being respectively supported against the associated end wall of said cylinder chamber solely under the preloading of the associated coil spring.

5. A device according to claim 3, in which said locking device includes a locking pin for effecting fixing of said annular piston which is acted upon by pressure medium; which includes a snap device arranged in said cylindrical part and projecting into said cylinder chamber in the operating position, said snap device being located across from said locking device and cooperating with said locking pins for effecting said fixing of said annular piston; and in which said non-spring-loaded annular piston is provided with a piston neck which extends in the axial direction toward said snap device for engaging and returning same to a rest position within said cylindrical part.

6. A device according to claim 1, in which said locking device includes a spring-loaded locking pin for effecting fixing of said annular piston which is acted upon by pressure medium; in which said last mentioned annular piston is provided with a peripheral recess; and in which said locking device further includes a piston-cylinder unit for pushing said locking pin into engagement with said peripheral recess of said annular piston.

7. A device according to claim 6, in which said locking device further includes a spring-loaded piston provided with a peripheral groove, and a blocking device comprising a piston-cylinder unit and a spring-loaded pin actuated by said last mentioned piston-cylinder unit for insertion into said peripheral groove of the piston of said locking device during the rest position of the latter.

8. A device according to claim 7, which includes conduits interconnecting the cylinder chambers of said locking device, said blocking device, and said housing, and at least one control device for regulating same.

9. A device according to claim 1, in which the outer ends of said guide rod segments are respectively provided with a fastening eye which in turn are respectively provided with a Cardanically movable wear-resistant bearing.

* * * * *